United States Patent
Fontana et al.

(10) Patent No.: US 7,326,853 B2
(45) Date of Patent: Feb. 5, 2008

(54) TERMINAL BOX FOR ELECTROTECHNICAL USES AND CORRESPONDING METHOD OF MANUFACTURING

(75) Inventors: Rodolfo Fontana, Bisuschio (IT); Giuseppe Morini, Brescia (IT)

(73) Assignee: ABB Service S.r.l., Milan (IT)

( * ) Notice: Subject to any disclaimer, the term of this patent is extended or adjusted under 35 U.S.C. 154(b) by 0 days.

(21) Appl. No.: 11/141,007

(22) Filed: Jun. 1, 2005

(65) Prior Publication Data

US 2005/0263433 A1 Dec. 1, 2005

(30) Foreign Application Priority Data

Jun. 1, 2004 (IT) .......................... MI2004A1109

(51) Int. Cl.
*H02G 3/08* (2006.01)

(52) U.S. Cl. ................... 174/50; 174/520; 174/17 R; 220/3.2; 439/535

(58) Field of Classification Search ............... 174/50, 174/520, 17 R, 17.05, 50.5, 66, 67, 542, 174/559, 53, 58, 57; 220/3.2, 3.3, 3.4, 3.5, 220/3.6, 3.7, 3.8, 3.9, 4.02, 241, 242; 439/76.1, 439/76.2, 535, 536; 29/592, 592.1

See application file for complete search history.

(56) References Cited

U.S. PATENT DOCUMENTS

| | | | | | |
|---|---|---|---|---|---|
| 3,910,448 | A | * | 10/1975 | Evans et al. ................. | 220/3.8 |
| 4,102,475 | A | * | 7/1978 | Kalvaitis ..................... | 220/3.8 |
| 5,072,848 | A | * | 12/1991 | Pipis et al. ................... | 174/66 |
| 5,272,279 | A | * | 12/1993 | Filshie ........................ | 174/50 |
| 5,359,152 | A | * | 10/1994 | Hone-Lin .................... | 174/53 |
| 5,683,005 | A | * | 11/1997 | Mordick ..................... | 220/3.7 |
| 6,369,320 | B1 | * | 4/2002 | Okamoto ..................... | 174/50 |
| 6,527,302 | B1 | * | 3/2003 | Gault et al. .................. | 174/50 |
| 6,545,861 | B1 | * | 4/2003 | Hayes et al. ................ | 174/559 |
| 6,677,519 | B2 | * | 1/2004 | Rumsey et al. .............. | 174/50 |
| 6,831,222 | B2 | * | 12/2004 | Pastuch ....................... | 174/58 |
| 6,940,016 | B1 | * | 9/2005 | Cornett et al. ............... | 174/58 |
| 7,077,281 | B2 | * | 7/2006 | Sato et al. ................... | 220/3.8 |

* cited by examiner

*Primary Examiner*—Angel R. Estrada
(74) *Attorney, Agent, or Firm*—Connolly Bove Lodge and Hutz LLP

(57) ABSTRACT

A terminal box for electrotechnical uses and the like includes a base designed to be fixed to a supporting surface and a closing lid that can be coupled to the base. The base is formed by a shaped metal body so as to define a housing cavity without joins at least along the development of the surfaces constituting its perimetric walls.

8 Claims, 5 Drawing Sheets

TERMINAL BOX FOR ELECTROTECHNICAL USES AND CORRESPONDING METHOD OF MANUFACTURING

BACKGROUND

The present invention relates to a terminal box for electrotechnical uses and the like, and the corresponding method of manufacturing.

The use of terminal boxes is widely known and widespread in the electrotechnical field. Said terminal boxes are normally wall-mounted or mounted on equivalent supporting surfaces, and are designed for containing electrotechnical material, such as for example various electronic components, cables, connectors, wiring harnesses, etc., or even tools that can be used on site by an electrician for interventions of various nature, for example maintenance operations or modifications to existing wiring.

Currently, boxes of this type are available in a wide range of shapes and embodiments on account of the wide spectrum of applications, as well as of the need to meet, at least in some cases, specific national and international standards. For example, terminal boxes must usually guarantee that the internal environment, in which the material is housed will be as protected as possible from external factors, such as the introduction of dust, humidity, infiltration of water, and so forth. Said prerogatives become even more important and determining, for example, in the cases where the box is used in external environments, and/or also when it is necessary to guarantee perfect tightness of the internal space.

Other non-negligible aspects are represented by the need to have boxes presenting a structural rigidity and solidity adequate for the uses, as well as being suitable for facilitating interventions of operators, typically when it is necessary to carry out wiring within the boxes themselves.

Generally, the terminal boxes currently available on the market are constituted by a box like metal body having a parallelepiped al base, which delimits the space for housing the electrotechnical material, and a lid that is connected to the base itself so as to close the housing space.

In the current state of the art, the solutions adopted for construction of said boxes, in particular as regards the base, are not fully satisfactory. In fact, the embodiment most commonly and widely used envisages the use of one or more metal sheets that are first cut along defined traces, then bent, and finally welded along the lines of reciprocal connection of the side walls, or else joined along the same lines, for example by the adoption of particular forms of shaping of the edges of cut sheet metal to enable them to be slotted together or else by the application of joining pins. Said solutions may lead to the formation of imperfect joins, for example on account of the possible presence of holes in the joins or of irregularities in the welding beads, with possible problems from the standpoint of tightness and of the protection of the internal housing space from the external environment, or may simply create difficulties purely as regards manageability of the box. Furthermore, a number of production steps are required, with the intervention of specialized staff or automated machinery, for example shearing machines and welding robots. Another delicate aspect, and one that is not always satisfactorily dealt with in the solutions of a known type, regards the coupling between the closing lid and the base, which must obviously be as simple as possible and at the same time ensuring complete tightness. Finally, to guarantee structural strength recourse is almost always had to the adoption of sheet metal of a thickness larger than what is necessary or to the adoption of strengthening plates set in positions corresponding to the lateral sharp edges of the base.

SUMMARY

Consequently, the main purpose of the present invention is to provide a terminal box for electrotechnical uses and the like that will enable the drawbacks referred to previously to be overcome and that, as compared to the boxes of a known type, has components that can be obtained in a simplified and economically advantageous way, with an improved structure capable of providing optimized functional performance, in particular as regards tightness and protection of the housing space with respect to the external environment, coupling between the parts, principally between base and closing lid, as well as structural strength.

The above purpose, as well as others, which will emerge more clearly from what follows, are achieved by a terminal box for electrotechnical uses and the like, which comprises a base designed to be fixed to a supporting surface and a closing lid that can be connected thereto, at least said base being formed by a metal body shaped so as to define a housing cavity without joins at least along the development of the surfaces constituting its perimetric walls.

The purpose of the present invention is achieved also by a method for the manufacturing of a terminal box for uses of an electrotechnical nature and the like, of the type comprising a base and a lid that can be fitted thereto, said method comprising the following steps:

positioning a sheet of metal of predefined thickness in a die; and pressing said sheet of metal in a single step to define a shaped body without joins having a central wall, from which there extend transversely four side walls.

BRIEF DESCRIPTION OF THE DRAWINGS

Further characteristics and advantages of the invention will emerge more clearly from the description of preferred, but non-exclusive, embodiments of the terminal box according to the invention, illustrated by way of non-limiting example in the attached plate of drawings, in which.

DETAILED DESCRIPTION

Figure 1:
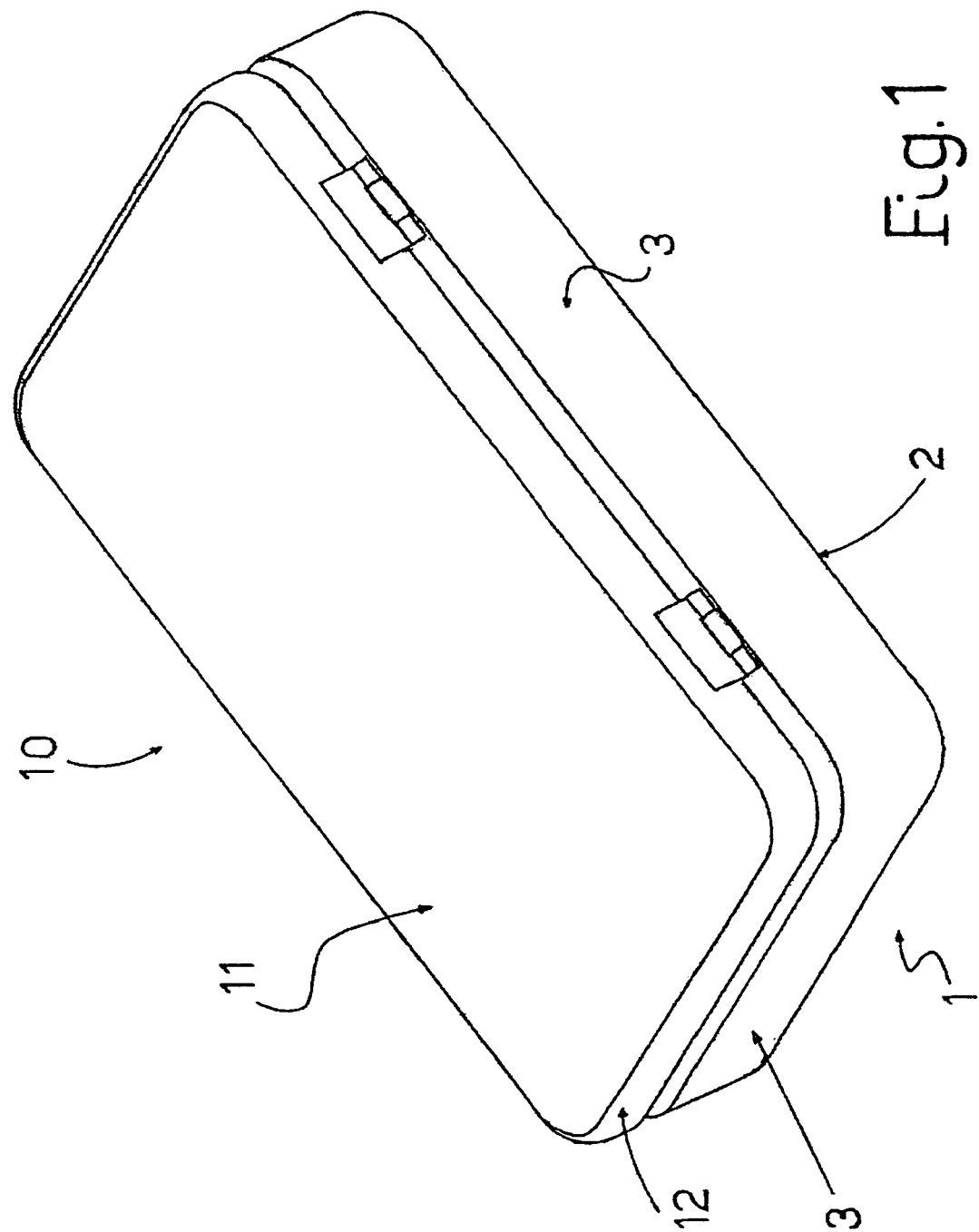
FIG. 1 is a perspective view illustrating an embodiment of the terminal box according to the invention.

With reference to the above figures, the terminal box according to the invention comprises a base 1 designed to be fixed to a supporting surface, typically a wall or an equivalent surface, and a closing lid 10 that can be fitted thereto. Advantageously, in the terminal box according to the invention at least the base 1 is formed by a shaped metal body so as to define a housing cavity 30 that does not have joins at least along the development of the surfaces constituting its perimetric walls. In particular, the metal body is to advantage formed by a pressed sheet, of desired thickness, which directly defines a rear wall 2 for fixing to the supporting surface, and four side walls 3, which extend transversely from the rear wall 2 and the free edges of which delimit primevally an open face designed for coupling with the closing lid 10. In practice, the base 1 of the box according to the invention is constituted by a body in which all the perimetric walls form a single integral unit with continuous surface development, without, that is, the presence of welds or other forms of joining, in particular along the common surfaces of the side walls, which, instead, is typical of the terminal boxes of the known art.

Figure 2:
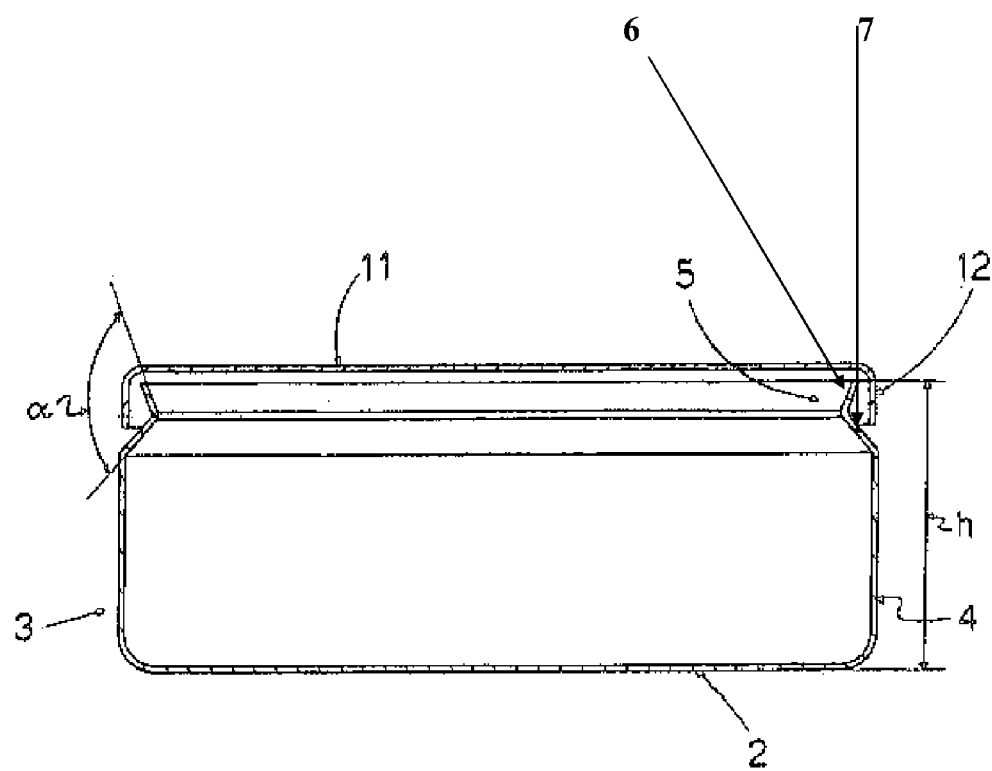
FIG. 2 is a cross-sectional view illustrating schematically a preferred embodiment of the terminal box according to the invention.

According to a preferred embodiment, the side walls 3 of the terminal box moreover have, along their surface development, a shaped portion 5 designed to favor coupling with the closing lid 10. In particular, as illustrated in FIG. 2, said side walls 3 have a predominant stretch 4 with substantially rectilinear development, which is radiused, on the one hand, with the rear wall 2, and, on the other, with the shaped portion 5. In the embodiment illustrated, said shaped portion 5 defines primevally the free edge of coupling with the lid 10 and is preferably set-in in the direction of the internal area of the base 1, with respect to the stretch with rectilinear development 4. Advantageously, said shaped portion 5 has a substantially V-shaped configuration, with the vertex set in the internal area of the base 1 itself. Preferably, as illustrated in detail in FIG. 3, the two branches 6 and 7 of the V-shaped portion have different lengths and form between them an obtuse angle a, i.e. an angle of less tha 180°, comprised, for example, between 140° and 170°, preferably between 145° and 165°, even more preferably between 150° and 160°.

Advantageously, the base has a depth h, measured as the distance between the top free edge and the external surface of the rear wall 2, which can be between 70 mm and 80 mm, or between 110 mm and 120 mm, or between 140 mm and 150 mm.

In the embodiment of the box according to the invention, also the closing lid 10 is preferably formed by a shaped metal body without joins at least along the development of the surfaces constituting its perimetric walls. In particular, in a way similar to the base 1, the metal body of the lid 10 is constituted, in its basic structure, by a pressed metal sheet of desired thickness, defining a substantially plane wall 11 for top closing of the housing cavity 30, from which there extend four side walls 12, with substantially rectilinear development, structurally continuous with respect to one another and with the wall 11, designed to embrace the shaped portion 5.

Figure 3:
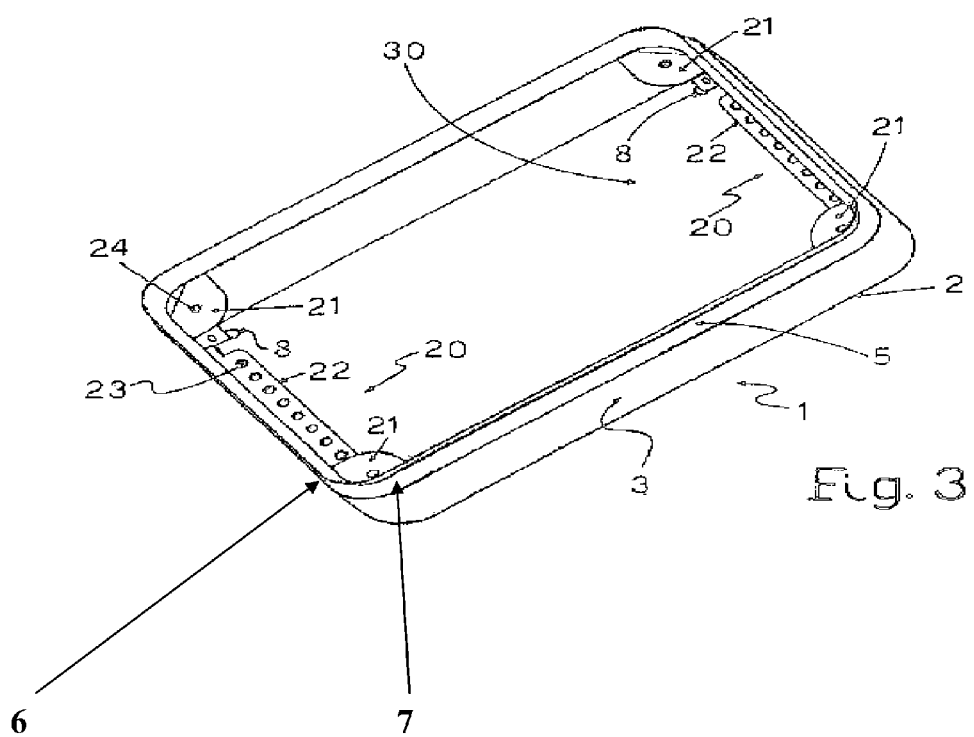
FIG. 3 is a perspective view illustrating the base of the terminal box according to the invention.
Figure 4:
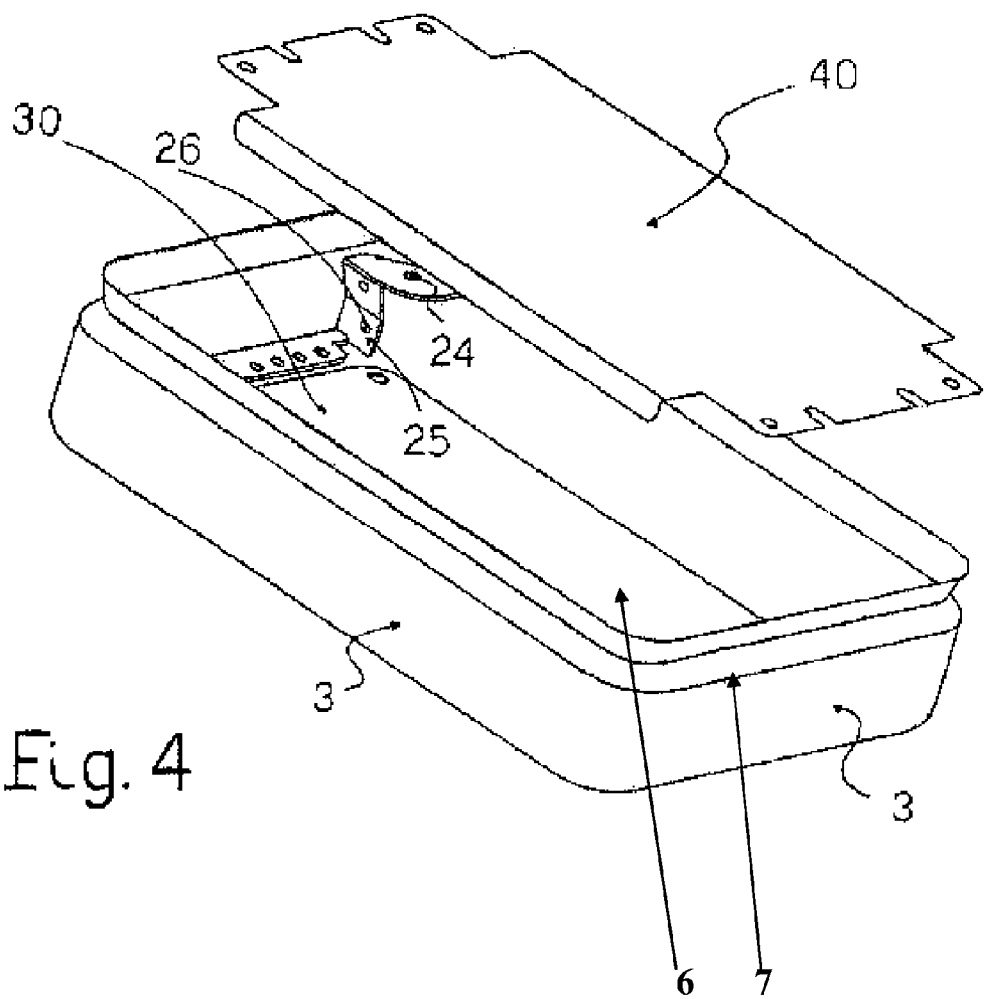
FIG. 4 is a perspective view illustrating a supporting plate during insertion in the base of FIG. 3.

As illustrated more clearly in FIGS. 3 and 4, the terminal box according to the invention can moreover preferably comprise a pair of supporting brackets 20, which are fixed internally to the base 1 in positions corresponding to two sides opposite to one another. More in particular, each bracket 20 has a first angular element 21 and a second angular element 21 fixed in positions corresponding to two internal sharp edges of the base 1, and a rod-shaped stretch 22, which structurally connects the two angular elements 21 and along the development of which holes 23 are defined. Said holes 23 are designed to enable fixing of a mounting plate, illustrated in FIG. 4, designated by the reference number 40, said plate being in turn designed for the mounting thereon of components, such as, for example, cable connectors or other material.

The angular elements 21 comprise: a first plane portion set at a distance and substantially parallel to the rear wall 2, on which a hole is provided for fixing 24; and a second portion 25 that extends towards the rear wall 2, joining said first plane portion to the rod-shaped stretch 22. Also on said second portion 25 one or more holes 26 can be provided, designed, for example, to enable passage or fixing of cables possibly at input to/output from the box.

Figure 5:
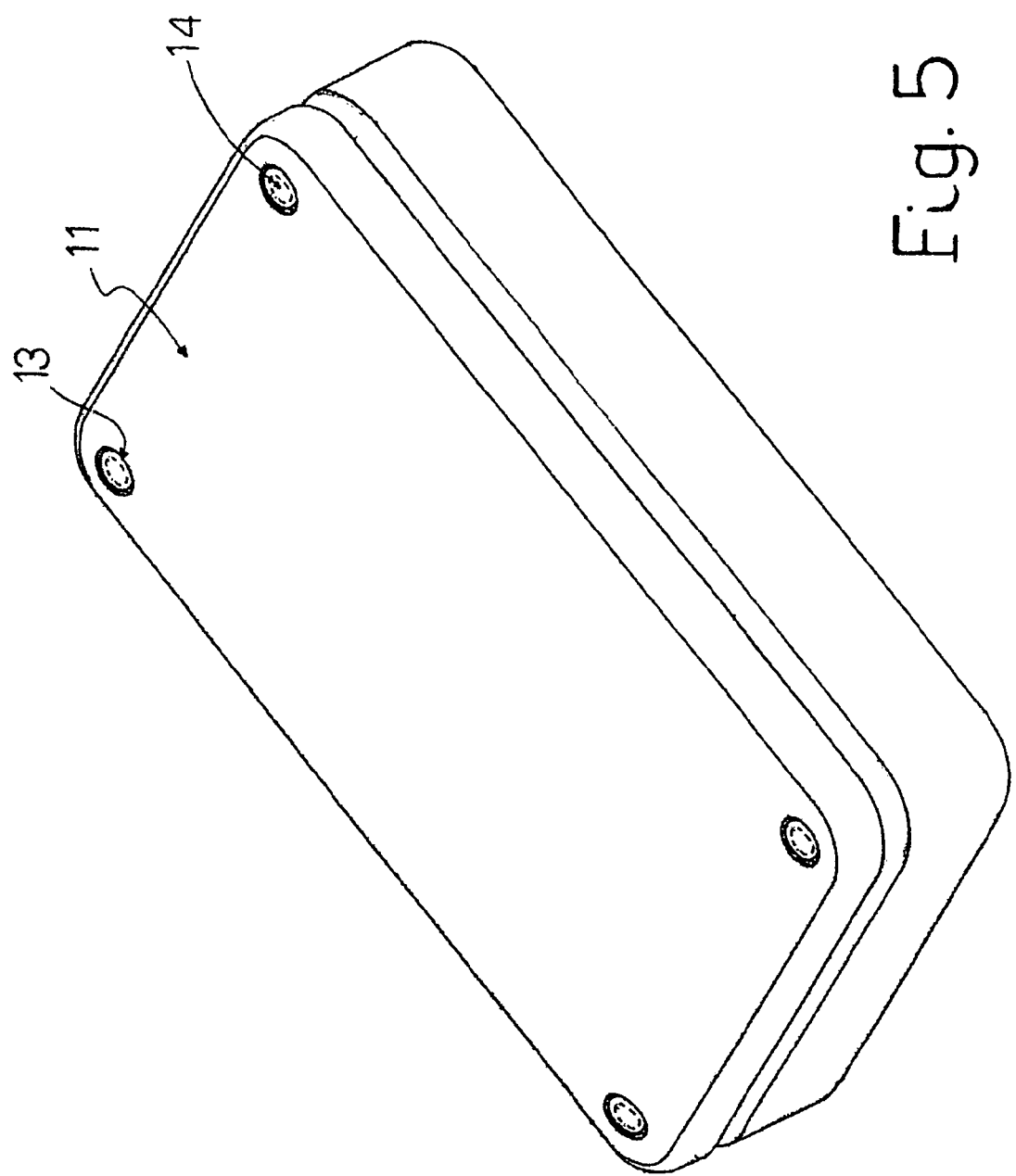
FIG. 5 is a perspective view illustrating the terminal box according to the invention in accordance with a variant embodiment.

In practical use, the box according to the invention is connected to a wall (or equivalent surface), the base 1 being fixed thereto, for example by screws inserted in purposely provided holes 8 made on the rear wall 2. Where necessary, the plate 40 is fixed to the brackets 20, with the holes 23, which, being arranged along the entire rod-shaped stretch 22, facilitate fixing of plates even having dimensions different from one another. After the material to be contained therein has been introduced into the housing space 30, and/or possible wiring-up has been carried out, the box is closed by coupling the closing lid 10 to the base 1. In particular, the lid 10 can to advantage be hinged to the base 1 along one of the side walls, as illustrated in the embodiment of FIG. 1, or else, as illustrated in FIG. 5, the lid 10 can be fixed directly to the angular elements 21, for example by means of fixing screws 13 inserted in the holes 24 and in purposely provided holes 14 made on the wall 11. Wherever desired, coupling between the base 1 and the lid 10 can moreover be performed simultaneously in both of the ways described above.

The base 1 and/or the closing lid 10 can to advantage be obtained using an extremely simple and economically advantageous method, which enables optimization of the production steps. Consequently, constituting a further subject of the present invention is a method for the manufacturing of a terminal box for uses of an electrotechnical nature and the like, of the type comprising a base and a lid that can be fitted thereto, said method being characterized in that it comprises the following steps:

positioning a sheet of metal of predefined thickness in a die; and pressing said sheet of metal in a single step to define a shaped body having a central wall (wall 2 or wall 11), from which there extend transversely four side walls (walls 3 or walls 12), without any joins between them.

It may in practice be noted how the terminal box according to the invention enables the pre-set purpose to be achieved, at the same time providing a series of advantages as compared to the known art. In particular, as described previously, both the base 1 and the lid 10 are made in an extremely simple way, without having to resort, for example, to shearing and subsequent joining or welding of the various parts constituting the perimetric walls, and thus preventing the need for any intervention of specialized staff, welding robots, etc. In this way, there is an intrinsic protection of the internal housing space from any infiltration of water, dust, humidity, etc. along the side surfaces of the box. Furthermore, the box-to-base coupling is obtained in a simple and effective way. In particular, the shaped portion 5 of the base 1, thanks to its particular structure described previously, prevents altogether, or at least markedly limits, said infiltration also along the surfaces of coupling with the lid. The shaped portion 5, thanks to its set-in shape, can also constitute a surface of contrast and arrest for a handle-type closing device possibly provided on the lid. In addition, the brackets 20, by virtue of their structural shape and positioning, function as elements for structural stiffening the entire base 1 and also facilitate possible operations, for example for mounting the plate 40 and the possible wiring thereon.

The terminal box thus conceived may undergo numerous modifications and variations, all falling within the scope of the inventive idea. For example, if it were to be necessary to provide wiring with inlets to and/or outlets from the box, it is possible to envisage, on one or more of the side walls, purposely provided openings, appropriately shaped and protected, or else, as a greater guarantee of tightness, it is also possible to adopt a gasket set primevally on the inside of the lid. Furthermore, all of the items may be replaced by other technically equivalent elements. In practice, the materials, as well as the dimensions, may be any whatsoever according to the requirements and the state of the art.

What is claimed is:

1. A terminal box for electrotechnical uses, comprising:
a base designed to be fixed to a supporting surface; and
a closing lid that can be connected thereto,
wherein said base is formed by a shaped metal body comprising a pressed sheet of metal defining four side walls and a rear wall for fixing to the supporting surface,
said four side walls extending transversely from said rear wall and having free edges which perimetrally delimit an open face arranged for coupling with the closing lid, and
said side walls having, along their surface development, a shaped portion perimetrally defining said free edges;
said closing lid is formed by a shaped metal body without joins at least along the development of surfaces constituting perimetral walls of said closing lid; and
said shaped portion includes a V-shaped portion, with two branches and a vertex, said vertex being set towards an internal area of the base;
wherein said terminal box further comprises a pair of supporting brackets fixed internally to the base at two sides opposite to one another;
wherein said supporting brackets have a first angular element and a second angular element fixed in positions corresponding to two internal sharp edges of the base, and a rod-shaped stretch that structually connects said two angular elements and along the development of which are defined holes for fixing a mounting plate;
wherein said angular elements comprise a first plane portion that is set parallel to said rear wall and a second portion that extends in the direction of said rear wall thereby joining said first portion to the rod-shaped stretch, at least one hole being provided on said plane portion and on said second portion;
wherein said rod-shaped stretch is set parallel to said rear wall, the distance between said rod-shaped stretch and said rear wall being shorter than the distance between the plane portion of said angular elements and said rear wall; and
wherein the plane portion of said angular elements is positioned relatively close to said V-shaped portion, substantially at a level of the vertex of said V-shaped portion.

2. The terminal box according to claim 1, wherein said side walls have a predominant stretch with substantially rectilinear development, said predominant stretch having one end radiused to the rear wall and another end radiused to said shaped portion.

3. The terminal box according to claim 2, wherein said V-shaped portion two branches and a vertex, with the vertex set towards an internal area of the base.

4. The terminal box according to claim 1, wherein the two branches have different lengths and form between them an angle of less than 180°.

5. The terminal box according to claim 4, wherein said angle is between 140° and 170°.

6. The terminal box according to claim 1, wherein the metal body is formed by a pressed metal sheet defining a substantially plane wall for top closing of a cavity within the terminal box, and wherein four side walls arranged to embrace said shaped portion extend from said plane wall.

7. The terminal box according to claim 1, wherein said lid is hinged on said base along one of said side walls.

8. The terminal box according to claim 1, wherein said lid is coupled to the base and is fixed on said angular elements.

* * * * *